United States Patent
Xu et al.

(10) Patent No.: US 12,435,752 B2
(45) Date of Patent: Oct. 7, 2025

(54) SPHERICAL JOINT, SPHERICAL JOINT ASSEMBLY, AND ULTRASONIC IMAGING DEVICE

(71) Applicant: GE Precision Healthcare LLC, Wauwatosa, WI (US)

(72) Inventors: Sheng Xu, Wuxi (CN); Hongyu Zhao, Wuxi (CN); Qiang Yao, Wuxi (CN); Liping Chen, Wuxi (CN); Bing Li, Wuxi (CN); Bo Dan, Wuxi (CN)

(73) Assignee: GE Precision Healthcare LLC, Wauwatosa, WI (US)

( * ) Notice: Subject to any disclaimer, the term of this patent is extended or adjusted under 35 U.S.C. 154(b) by 544 days.

(21) Appl. No.: 17/892,552

(22) Filed: Aug. 22, 2022

(65) Prior Publication Data

US 2023/0069725 A1    Mar. 2, 2023

(30) Foreign Application Priority Data

Aug. 31, 2021 (CN) .......................... 202111011556.7

(51) Int. Cl.
| | |
|---|---|
| *F16C 11/06* | (2006.01) |
| *A61B 8/00* | (2006.01) |
| *G03B 17/56* | (2021.01) |

(52) U.S. Cl.
CPC ............ *F16C 11/0604* (2013.01); *A61B 8/44* (2013.01); *F16C 11/0685* (2013.01); *G03B 17/561* (2013.01)

(58) Field of Classification Search
CPC ....... A61B 8/4218; A61B 8/44; A61B 8/4405; A61B 8/4433; F16C 11/0604; F16C 11/0609; F16C 11/0614; F16C 11/0685; F16C 11/069; F16C 11/0695; F16C 11/106; G06B 17/561; Y10T 403/32565;
(Continued)

(56) References Cited

U.S. PATENT DOCUMENTS

| | | | | | |
|---|---|---|---|---|---|
| 1,697,037 | A | * | 1/1929 | Witz | ....................... F16M 11/14 403/114 |
| 3,307,857 | A | * | 3/1967 | Robertson | ................ B60D 1/06 403/122 |

(Continued)

FOREIGN PATENT DOCUMENTS

| | | | | | |
|---|---|---|---|---|---|
| EP | 2407677 | A1 | * | 1/2012 | ............. F16C 11/106 |
| FR | 2886257 | A1 | * | 12/2006 | .......... F16C 11/0604 |
| GB | 2496582 | A | * | 5/2013 | .......... F16C 11/0604 |

*Primary Examiner* — Josh Skroupa (57) ABSTRACT

A spherical joint includes a body portion and a blocking portion. The body portion includes a ball portion and a joint portion. The ball portion and the joint portion have an inner surface that links the two portions together in an axial direction and an outer surface opposite to the inner surface. The outer surface of the ball portion includes a spherical surface. The body portion further includes a first section and a second section. Each of the first section and the second section intersects with the inner surface and the outer surface such that the two sections together define a gap. The blocking portion is detachably connected to the body portion and shaped to match the gap, so that the blocking portion blocks the gap to form a hollow spherical joint structure. Further disclosed in the present application are a spherical joint assembly and an ultrasonic imaging device.

20 Claims, 5 Drawing Sheets

(58) Field of Classification Search
CPC ..... Y10T 403/32681; Y10T 403/32688; Y10T 403/32696
USPC .................................. 403/114, 128, 129, 130
See application file for complete search history.

(56) References Cited

U.S. PATENT DOCUMENTS

| | | | | |
|---|---|---|---|---|
| 4,974,802 | A * | 12/1990 | Hendren | ............... F16C 11/106 403/90 |
| 5,957,445 | A * | 9/1999 | Hagman | ............... F16C 11/106 269/75 |
| 8,424,823 | B2 * | 4/2013 | Fadler | .................... A61B 90/50 403/76 |
| 8,672,851 | B1 | 3/2014 | Quirk | |
| 11,255,375 | B2 * | 2/2022 | Wales | ................. F16C 11/0604 |
| 2002/0012566 | A1 * | 1/2002 | Auchinleck | ........... F16C 11/106 403/90 |
| 2003/0019511 | A1 * | 1/2003 | Liu | ....................... F16C 11/106 403/90 |
| 2012/0063840 | A1 * | 3/2012 | Yu | ......................... F16C 11/106 403/141 |
| 2021/0404513 | A1 * | 12/2021 | Faison | ................ F16C 11/0604 |
| 2022/0065389 | A1 * | 3/2022 | Grover | .................. F16C 11/106 |

\* cited by examiner

SPHERICAL JOINT, SPHERICAL JOINT ASSEMBLY, AND ULTRASONIC IMAGING DEVICE

CROSS-REFERENCE TO RELATED APPLICATION

This application claims priority to Chinese patent application number 202111011556.7, filed on Aug. 31, 2021, the entirety of which is incorporated herein by reference.

TECHNICAL FIELD

The present application relates to the medical field, and in particular to a spherical joint, a spherical joint assembly, and an ultrasonic imaging device.

BACKGROUND

A spherical joint assembly is a conventional component that enables movable connection between devices. The spherical joint assembly typically includes a spherical joint and a housing that houses the spherical joint. Benefiting from a smooth and regular outer surface of the spherical joint, the connection angle and direction between the aforementioned devices can be adjusted with high degree of freedom. Additionally, in some use scenarios, the devices also need to be electrically connected by means of a cable. In this case, the spherical joint may further be configured to have a structure having a middle opening for the passage of the cable.

Some ultrasonic imaging devices include a scanning assembly. The scanning assembly can be connected to a body structure of the ultrasonic imaging device by means of a spherical joint, whereby a relative position to a surface to be scanned can be flexibly adjusted, so as to ensure high-quality imaging. The scanning assembly requires a cable to be electrically connected to the body of the ultrasonic imaging device. For example, an ultrasonic transducer assembly in the scanning assembly is typically connected to the body of the ultrasonic imaging device by means of a cable, thereby implementing power supply and transmission of ultrasonic signals.

SUMMARY

The inventors found that an ultrasonic transducer assembly (e.g., a printed circuit board (PCB)) and a cable need to be fixedly connected to each other by welding, etc., so as to ensure good electrical connection performance. The aforementioned fixed connection manner causes the cable and the transducer assembly to be nondetachable. The nondetachable ultrasonic transducer assembly connected to an end portion of the cable is typically large-sized, and cannot pass through a middle opening of a spherical joint. Although the cable may avoid the spherical joint by winding, etc., the volume of a spherical joint assembly and the risk of cable wear due to squeezing by the spherical joint are inevitably increased in this way. Furthermore, if the spherical joint is designed as a split structure, an outer surface of the spherical joint no longer has a smooth and regular shape, thereby impacting the degree of movement smoothness of the spherical joint assembly.

The aforementioned deficiencies, disadvantages, and problems are solved herein, and these problems and solutions will be understood through reading and understanding of the following description.

Some embodiments of the present application provide a spherical joint. The spherical joint includes a body portion and a blocking portion. The body portion includes a ball portion and a joint portion. The ball portion and the joint portion have an inner surface that links the two portions together in an axial direction and an outer surface opposite to the inner surface. The outer surface of the ball portion includes a spherical surface. The body portion further includes a first section and a second section. Each of the first section and the second section intersects with the inner surface and the outer surface such that the two sections together define a gap. The size of the gap on any radial circumference of the spherical surface is less than half of the length of the radial circumference. The blocking portion is detachably connected to the body portion and shaped to match the gap, so that the blocking portion blocks the gap to form a hollow spherical joint structure.

In some embodiments of the present application, a spherical joint assembly is further provided. The spherical joint assembly includes a spherical joint and a housing. The spherical joint includes a body portion and a blocking portion. The body portion includes a ball portion and a joint portion. The ball portion and the joint portion have an inner surface that links the two portions together in an axial direction and an outer surface opposite to the inner surface. The outer surface of the ball portion includes a spherical surface. The body portion further includes a first section and a second section. Each of the first section and the second section intersects with the inner surface and the outer surface such that the two sections together define a gap. The size of the gap on any radial circumference of the spherical surface is less than half of the length of the radial circumference. The blocking portion is detachably connected to the body portion and shaped to match the gap, so that the blocking portion blocks the gap to form a hollow spherical joint structure. The housing includes a first end and a second end arranged opposite to each other. The first end includes a circular arc-shaped inner cavity and an opening. The inner cavity is shaped to match the ball portion of the spherical joint. The opening is sized to be less than an outer diameter of the ball portion and to allow passage of the joint portion.

In some embodiments of the present application, an ultrasonic imaging device includes: a scanning assembly including an ultrasonic transducer, an adjustable arm, a main device connected to one end of the adjustable arm, and a spherical joint assembly. The spherical joint assembly includes a spherical joint and a housing. The spherical joint includes a body portion and a blocking portion. The body portion includes a ball portion and a joint portion. The ball portion and the joint portion have an inner surface that links the two portions together in an axial direction and an outer surface opposite to the inner surface. The outer surface of the ball portion includes a spherical surface. The body portion further comprises a first section and a second section. Each of the first section and the second section intersects with the inner surface and the outer surface such that the two sections together define a gap. The size of the gap on any radial circumference of the spherical surface is less than half of the length of the radial circumference. The blocking portion is detachably connected to the body portion and shaped to match the gap, so that the blocking portion blocks the gap to form a hollow spherical joint structure. The housing includes a first end and a second end arranged opposite to each other. The first end includes a circular arc-shaped inner cavity and an opening. The inner cavity is shaped to match the ball portion of the spherical joint. The opening is sized to be less than an outer diameter of the ball portion and to allow passage of the joint portion. The joint portion of the spherical joint is connected to the scanning assembly. The second end of the housing is connected to the other end of the adjustable arm.

It should be understood that the brief description above is provided to introduce, in simplified form, some concepts that will be further described in the detailed description. The brief description above is not meant to identify key or essential features of the claimed subject matter, and the scope is defined uniquely by the claims that follow the detailed description. Furthermore, the claimed subject matter is not limited to implementations that solve any disadvantages noted above or in any section of the present disclosure.

BRIEF DESCRIPTION OF THE DRAWINGS

The present application will be better understood by reading the following description of non-limiting embodiments with reference to the accompanying drawings, where.

DETAILED DESCRIPTION

Specific implementations of the present application will be described below. It should be noted that in the specific description of these embodiments, for the sake of brevity and conciseness, the present application may not describe all features of the actual implementations in detail. It should be understood that in the actual implementation process of any implementations, just as in the process of any engineering project or design project, a variety of specific decisions are often made to achieve specific goals of the developer and to meet system-related or business-related constraints, which may also vary from one implementation to another. Furthermore, it should also be understood that although efforts made in such development processes may be complex and tedious, for those of ordinary skill in the art related to the content disclosed in the present application, some design, manufacture or production changes based on the technical content disclosed in the present disclosure are only common technical means, and should not be construed as insufficient content of the present disclosure.

Unless otherwise defined, the technical or scientific terms used in the claims and the description are as they are usually understood by those of ordinary skill in the art to which the present invention pertains. "First," "second," and similar words used in the present application do not denote any order, quantity, or importance, but are merely intended to distinguish between different constituents. The terms "one" or "a/an" and similar terms do not denote a limitation of quantity, but rather the presence of at least one. The terms "include" or "comprise" and similar terms mean that an element or article in front of "include" or "comprise" encompass elements or articles and their equivalent elements listed after "include" or "comprise", and do not exclude other elements or articles. The terms "connect" or "connected" and similar words are not limited to physical or mechanical connections, and are not limited to direct or indirect connections.

Figure 1:
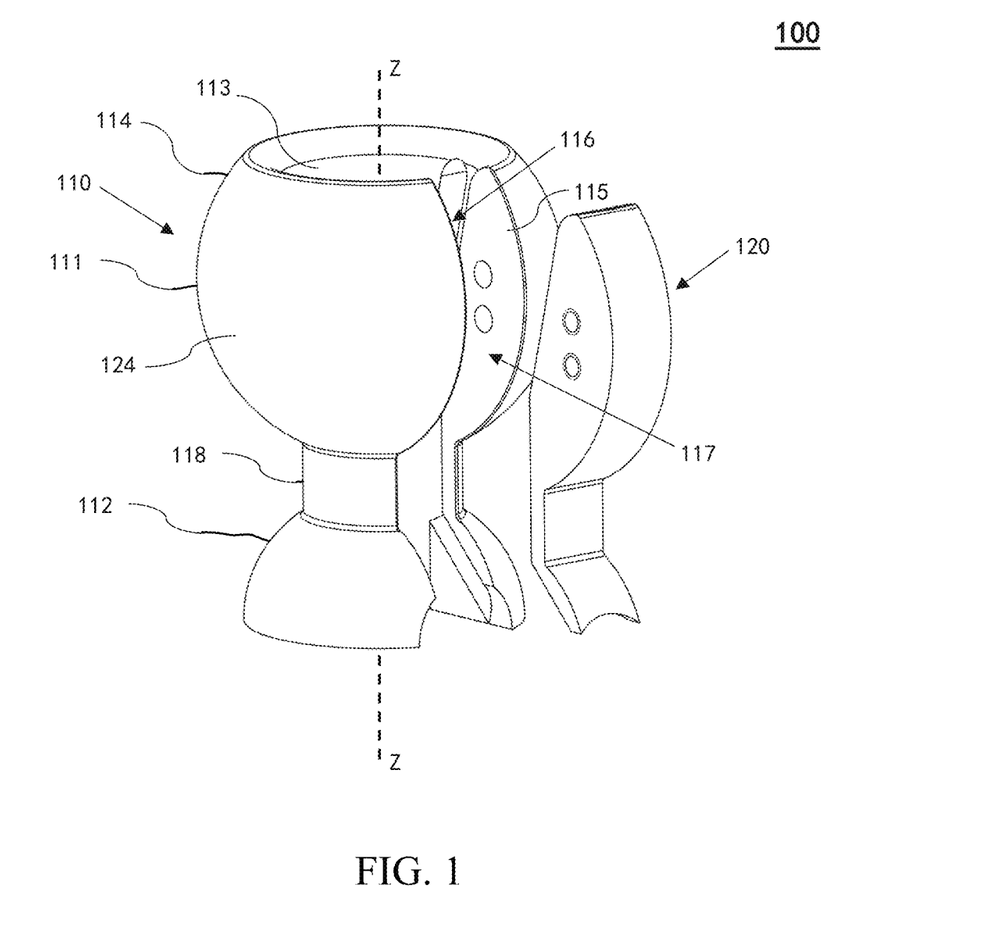
FIG. 1 is a perspective view of a spherical joint according to some embodiments of the present application.

FIG. 1 is a perspective view of a spherical joint 100 according to some embodiments of the present application.

As shown in FIG. 1, the spherical joint 100 may include a body portion 110 and a blocking portion 120. The body portion 110 may include a ball portion 111 and a joint portion 112. The ball portion 111 and the joint portion 112 have an inner surface 113 that links the two portions together in an axial direction (i.e. a Z-Z direction shown in FIG. 1) and an outer surface 114 opposite to the inner surface. The outer surface 114 of the ball portion 111 includes a spherical surface 124. The body portion 110 further includes a first section 115 and a second section 116. As shown in FIG. 1, each of the first section 115 and the second section 116 intersects with the inner surface 113 and the outer surface 114 such that the two sections together define a gap 117. The size of the gap 117 on any radial (i.e. a plane direction perpendicular to the Z-Z axis) circumference of the spherical surface 124 is less than half of the length of the radial circumference. Further, the blocking portion 120 is detachably connected to the body portion 110 and shaped to match the gap 117, so that the blocking portion 120 blocks the gap 117 to form the spherical joint 100 having a hollow structure.

In the aforementioned embodiments, the arrangement of the gap 117 can allow a cable to be placed into an opening formed by the inner surface of the body portion 110 without requiring insertion of an end portion of the cable. Furthermore, the size of the gap 117 is relatively small and is less than half of the circumference (it can be more clearly seen in the top-down view of FIG. 2). That is, a line of intersection between the spherical surface 124 of the ball portion 111 and any radial plane is configured to be greater than half of the circumference where the line of intersection is located. In such a configuration manner, even if the gap 117 is present, the integrity of the spherical structure of the spherical surface 124 will be not excessively affected. Even if a seam is present between the body portion 110 and the blocking portion 120 after the two portions are connected in the later installation process, the spherical joint 100, during movement, will not generate excessively large resistance with respect to a housing (to be exemplarily described hereinafter), and user operation will not be affected.

It can be understood that the aforementioned axial direction is the Z-Z axis direction as shown in FIG. 1, i.e. a direction longitudinally extending along the spherical joint 100. Correspondingly, the aforementioned radial plane direction is a plane direction perpendicular to the aforementioned Z-Z axis direction. Furthermore, the spherical structure does not mean an absolutely regular spherical structure, but an at least partially spherical structure enabling the movable connection of the spherical joint.

The detachable connection between the blocking portion 120 and the body portion 110 may be configured in various manners. For example, the portions may be detachably connected by a slot, or may be detachably connected by an auxiliary connection device, e.g., a screw. This will be exemplarily described below. The blocking portion 120 is shaped to match the gap 117, meaning that the blocking portion 120 can effectively match the first section 115 and the second section 116 of the body portion 110, and the blocking portion 120 has inner and outer surfaces substantially matching the inner and outer surfaces of the body portion 110. Such a configuration manner is advantageous in that the blocking portion 120 and the gap 117 can be combined to form a complete and regular spherical joint structure 100 having a middle opening after the blocking portion blocks the gap.

Further, one end of the joint portion 112 in close proximity to the ball portion 111 can be configured as a cylindrical rod 118. The cylindrical rod 118 can ensure that the spherical joint 100 is in smooth contact with the housing after the spherical joint is assembled into the housing (to be described in detail hereinafter). It can be understood that the cylindrical rod 118 likewise includes a gap, and is not completely cylindrical.

Figure 2:
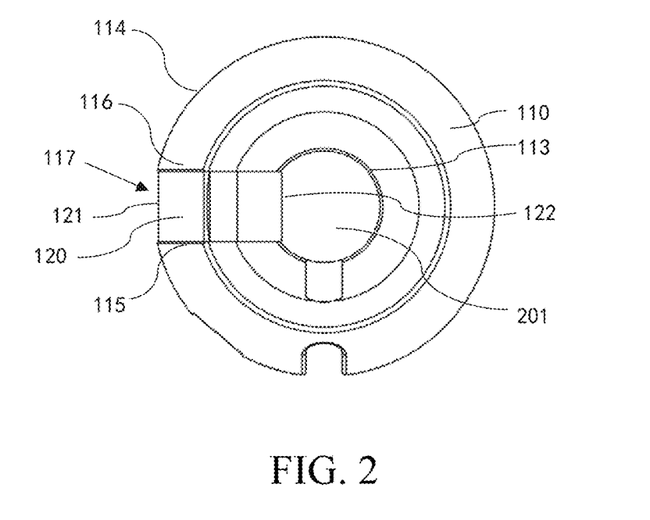
FIG. 2 is a top-down view of a spherical joint in an assembled state according to some embodiments of the present application.

The configuration manner of the gap 117 is further described in detail below. Referring to FIG. 2, a top-down view of a spherical joint in an assembled state according to some embodiments of the present application is shown.

As shown in FIG. 2, in some embodiments, the first section 115 and the second section 116 are configured to be arranged opposite to each other, so that the shape of the gap 117 is defined as a slot shape.

The aforementioned opposite arrangement means that the first section 115 and the second section 116 are not located on the same plane. The planes where the two sections are located may be parallel or have a certain included angle. As shown in FIG. 2, the shape of the gap 117 in such a configuration manner is defined as a slot shape. In a preferred embodiment, an included angle between the planes where the first section 115 and the second section 116 are located is configured to be 90° or less than 90°, so that the shape of the gap 117 is defined as a slot shape. In some other preferred embodiments, the angle of less than 90° may include the case where the first section 115 and the second section 116 are parallel, i.e., the included angle is zero degrees.

Such an arrangement manner has a variety of advantages. On the one hand, the integrity of the spherical surface of the body portion 110 of the spherical joint can be ensured to a greater extent, thereby ensuring that the regular shape of the spherical surface is not negatively affected even in the presence of an opening. On the other hand, since the slot structure of the gap 117 is small in volume, the maximum integrity of the inner surface 113 of the body portion 110 can also be ensured. The cable is not easily detached in a recess formed in the inner surface 113 during the installation of the cable and the spherical joint, and the inner surface 113 having high integrity does not easily cause wear of the cable after the installation is completed. Furthermore, the first section 115 and the second section 116 arranged opposite to each other can also achieve the effect of limiting slipping of the blocking portion 121 during the assembly process, thereby avoiding the problem of shape irregularity after the spherical joint is installed.

Furthermore, as can be seen more clearly in FIG. 2, the size of the gap 117 at the outer surface 114 is sufficiently small. The size of the gap on any radial circumference (i.e. any direction parallel to the paper in this top-down view) of the spherical surface of the outer surface 114 is less than half of the length of the radial circumference, and may also be understood to be less than a semicircle. In such slot-shaped configuration, the size of the gap is smaller and the integrity of the outer surface of the spherical surface is less affected.

With continued reference to FIG. 2, the blocking portion 120 may have two side faces that match the first section 115 and the second section 116. In this way, after the installation is completed, the blocking portion 120 can block the gap 117 to form a hollow spherical joint having a middle channel 201. The blocking portion 120 may further include a blocking portion outer surface 121 and a blocking portion inner surface 122. The blocking portion outer surface 121 matches the outer surface 114 of the body portion 110, and the blocking portion inner surface 122 matches the inner surface 113 of the body portion 110. In some embodiments, the blocking portion outer surface 121 and the blocking portion inner surface 122 may have a degree of bending that matches the outer surface 114 and the inner surface 113 of the body portion 110, respectively. In some other embodiments, the blocking portion outer surface 121 and the blocking portion inner surface 122 may be flat in the radial plane direction, as shown in FIG. 2. Such arrangement can reduce the machining precision requirements and costs of the blocking portion 120. The configuration manner of the slot-shaped gap 117 maximizes the integrity of the inner and outer surfaces of the body portion 110, so that the impact of the blocking portion 120 thereon is negligible.

Figure 3:
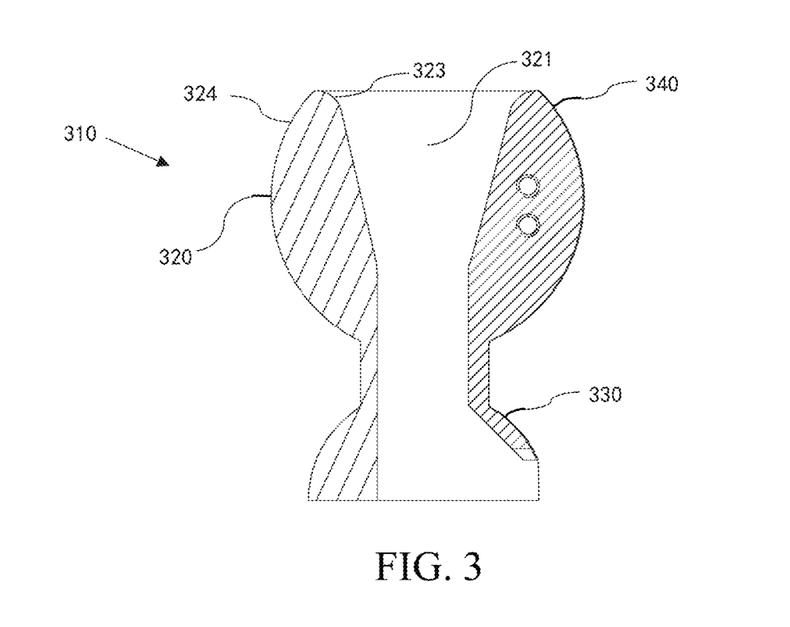
FIG. 3 is a cross-sectional view of a body portion of a spherical joint along an axial direction according to some embodiments of the present application.

The spherical joint should wear the cable as little as possible during use to ensure a longer service life and better user experience. To this end, further solutions are provided in other embodiments of the present application in addition to the slot-shaped gap 117 described above. Referring to FIG. 3, a cross-sectional view of a body portion 310 of a spherical joint along an axial direction according to some embodiments of the present application is shown.

Similar to the embodiment described above, the body portion 310 may include a ball portion 320 and a joint portion 330. Further, an inner surface 321 of the ball portion 320 gradually increases in size in a direction toward an end portion 340 of the ball portion 320.

Such an arrangement manner makes it possible to provide the cable with as much space as possible after assembly. In this way, less pressure and correspondingly less friction between the cable and the inner surface 321 are achieved during the movement of the spherical joint, thereby prolonging the service life of the cable.

It can be understood that the implementation method for gradually increasing the size may be arbitrary. For example, a conical configuration may be used as shown in FIG. 3. In other embodiments, a circular arc shape or other shapes may also be used, and detailed descriptions are omitted.

With continued reference to FIG. 3, in some embodiments, the inner surface 321 of the ball portion 320 includes an arc-shaped surface 323 at the end portion 340 of the ball portion 320. The arc-shaped surface 323 is connected to the outer surface 324 of the ball portion 320.

Such a configuration manner enables the cable to have a greater contact area with the end portion of the ball portion 320, thereby further reducing the extent to which the cable is worn in contact with the end portion 322 of the ball portion 320.

As described above, the body portion and the blocking portion of the spherical joint may be detachably connected in various manners. An exemplary description of a preferred detachable connection manner is provided below. In some embodiments, the spherical joint may further include a connection portion. Further, the body portion and the blocking portion are detachably connected by means of the connection portion. Providing a third-party connection portion can further improve the reliability of the spherical joint compared to merely providing a detachable connection between the body portion and the blocking portion. The arrangement manner of the connection portion is described in detail below.

Figure 4:
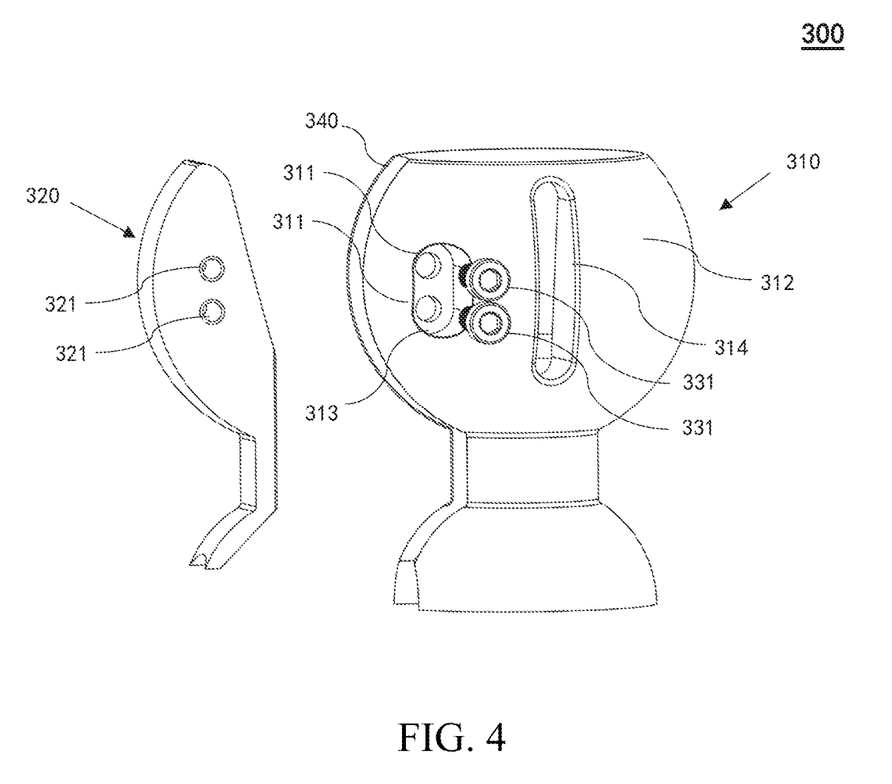
FIG. 4 is a perspective view of a connection manner between a body portion and a blocking portion of a spherical joint according to some embodiments of the present application.

Referring to FIG. 4, a perspective view of a connection manner between a body portion 310 and a blocking portion 320 of a spherical joint 300 according to some embodiments of the present application is shown. It can be understood that the shape, construction, etc. of the body portion 310 and the blocking portion 320 may be arbitrary in other embodiments of the present application. The body portion 310 is provided with a through-hole 311. The blocking portion 320 is provided with a screw hole 321 in a position corresponding to the through-hole 311. The connection portion includes a screw 331. The screw 331 passes through the through-hole 311 and is connected to the screw hole 321 so that the body portion 310 and the blocking portion 320 are detachably connected.

The aforementioned configuration manner has the advantages of easy assembly and disassembly and firm connection. More importantly, the simplicity, convenience, and reliability of assembly and disassembly of the body portion 310 and the blocking portion 320 of the present application are more prominent on the basis of combining the aforementioned configuration manner of the gap. Specifically, the size of the gap 340 is less than half of the circumference or the gap is even slot-shaped. Thus, during installation of the screw 331, slipping between the blocking portion 320 and the body portion 310 does not easily occur, thereby avoiding misalignment of the through-hole 311 and the screw hole 321 and further avoiding affecting the installation. Also, even if the assembly between the body portion 310 and the blocking portion 320 are not completely precise after the installation of the screw 331, the small-sized gap does not affect the integrity of the majority of the spherical surface of the outer surface of the spherical joint 300.

With continued reference to FIG. 4, in some embodiments, the outer surface 312 of the body portion 310 may include a recess portion 313. The recess portion 313 is sized to accommodate an end portion of the screw 331. The through-hole 311 is disposed in the recess portion 313.

Such an arrangement manner allows the end portion of the screw 311 to be accommodated in the recess portion 313 after the screw connects the body portion 310 and the blocking portion 320, thereby preventing the end portion of the screw 311 from protruding beyond the outer surface 312 and affecting the smoothness of the outer surface. It can be understood that the recess portion 313, while being a recess on the outer surface 312, is not so large in size as to affect the integrity of the outer surface 312.

Furthermore, the number of screws 331 and the numbers of corresponding through-holes 311 and screw holes 321 may be two, respectively, as shown in FIG. 4. Such a configuration manner ensures that the connection between the body portion 310 and the blocking portion 320 is stable and avoids rotation. Two through-holes 311 may be disposed in the same recess 313 as shown in FIG. 4, so as to reduce machining costs and improve accuracy.

The body portion 310 may also be provided with a slot 314. The slot 314 may be configured to match a structure, such as a block structure, in a housing (for example, the housing disclosed below) of a spherical joint assembly for limiting the movement of the spherical joint. However, the present application is not limited in any way, nor is the slot 314 necessary.

Figure 5:
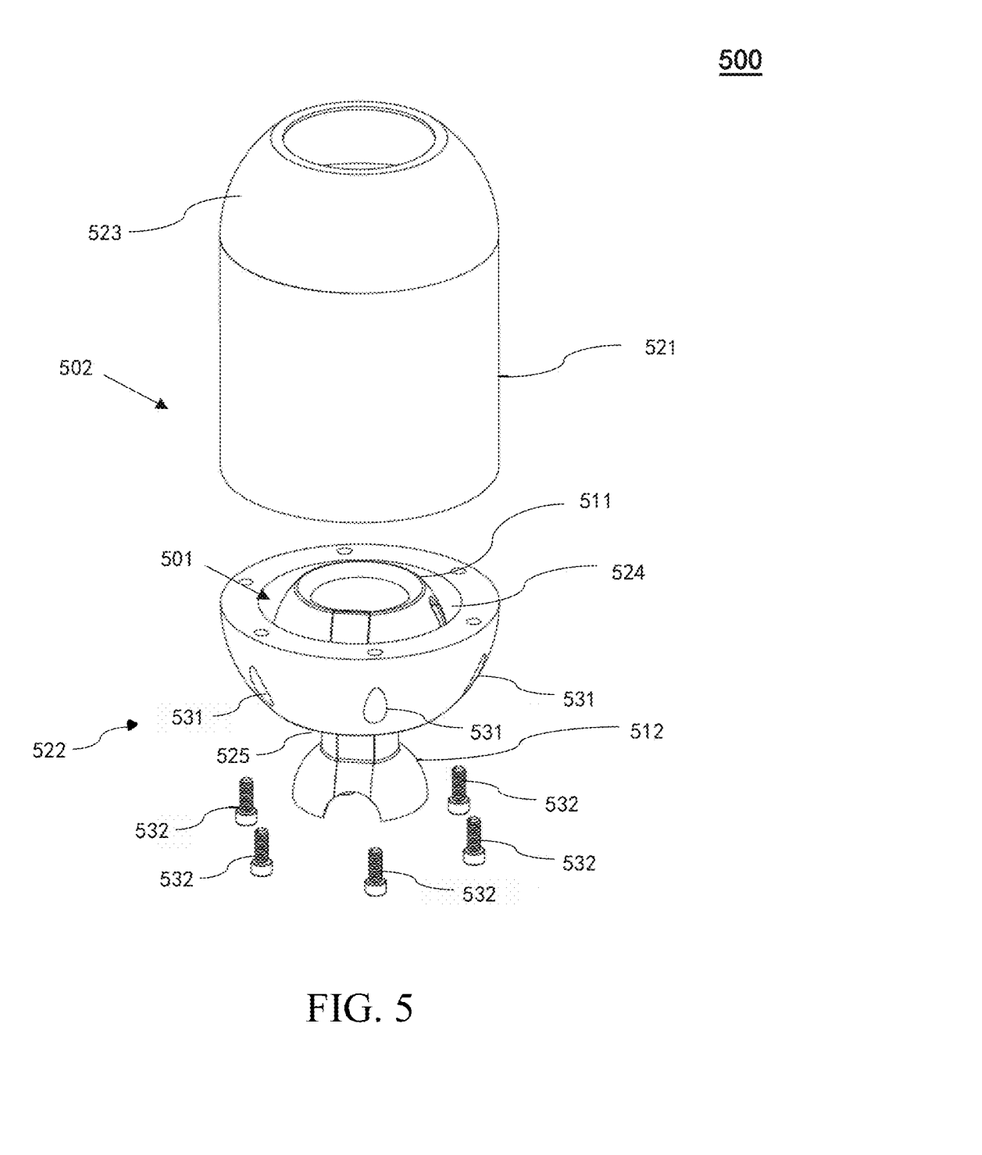
FIG. 5 is a perspective view of a spherical joint assembly according to some embodiments of the present application.

Some embodiments of the present application further provide a spherical joint assembly. Referring to FIG. 5, a perspective view of a spherical joint assembly 500 according to some embodiments of the present application is shown.

The spherical joint assembly may include a spherical joint 501 and a housing 502. The spherical joint 501 may be as disclosed in any of the embodiments of the present application, and detailed descriptions thereof are omitted. The housing 502 may include a first end 522 and a second end 523 arranged opposite to each other. The first end 522 includes a circular arc-shaped inner cavity 524 and an opening 525. The inner cavity 524 is shaped to match a ball portion 511 of the spherical joint 501. The opening 525 is sized to be less than an outer diameter of the ball portion 511 and to allow passage of a joint portion 512.

In such a configuration manner, any spherical joint disclosed above in the present application can be combined with a housing to form a spherical joint assembly structure. Thus, one of two devices where a spherical joint is required may be connected to a housing, for example, the second end 523 of the housing 502, and the other device may be connected to the joint portion 512, so that a direct high-degree-of-freedom connection can be achieved between the two devices, and the problem in which the end portion of the cable cannot pass through the middle channel of the spherical joint can be solved. Further, as stated above in the present application, the arrangement manner of the spherical joint in the present application ensures that no deliberate alignment is required during the assembly process, and the integrity of the spherical surface of the spherical joint can be ensured to the maximum extent after the assembly.

It should be noted that the shape of the inner cavity 524 does not need to match that of the ball portion 511 perfectly, and the size of the inner cavity 524 may be slightly larger than the spherical surface of the ball portion 511, thereby allowing the ball portion 511 to have a higher degree of freedom.

The housing 502 may be assembled with the spherical joint 501 in any manner. In some embodiments, the housing 502 may be configured as a detachable structure composed of a plurality of portions, as shown in FIG. 5. For example, the first end 522 of the housing 502 is detachably connected to a body 521 of the housing. In such an arrangement manner, during the assembly process, the first end 522 of the housing 502 may be detached first, then the spherical joint 501 is installed therein, and then the first end 522 is connected to the body 521 of the housing 502.

The aforementioned detachable connection manner may be arbitrary. For example, the first end 522 may be provided with a through-hole 531, as shown in FIG. 5. A plurality of through-holes 531 may be configured along the circumference of the first end 522 to ensure connection firmness. It can be understood that screw holes may be provided at corresponding positions on the body 521 of the housing 502. Further, the first end 522 may be detachably connected to the body 521 by means of screws 532.

Figure 6:
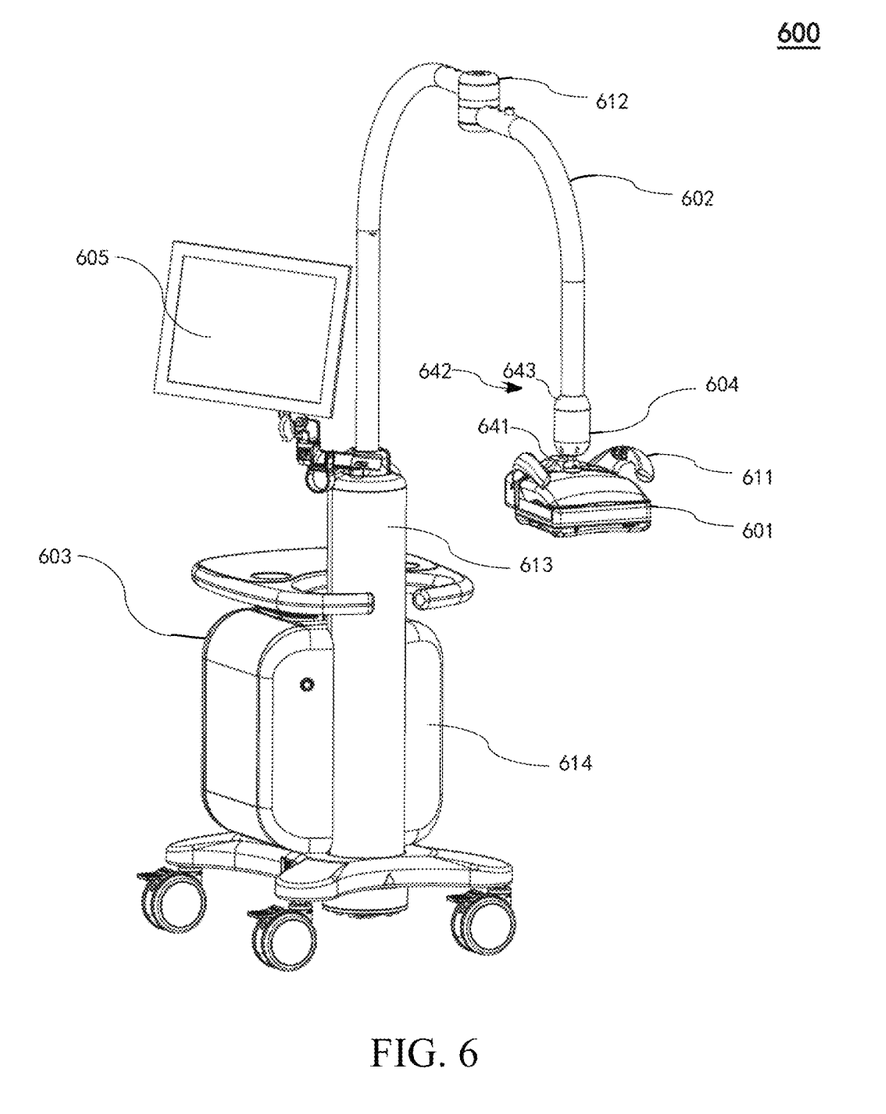
FIG. 6 is a perspective view of an ultrasonic imaging device according to some embodiments of the present application.

An ultrasonic imaging device is further provided in some embodiments of the present application. Referring to FIG. 6, a perspective view of an ultrasonic imaging device 600 according to some embodiments of the present application is shown.

The ultrasonic imaging device 600 may include: a scanning assembly 601, an adjustable arm 602, a main device 603, and a spherical joint assembly 604. The scanning assembly 601 includes an ultrasonic transducer. The main device 603 is connected to one end of the adjustable arm 602. The spherical joint assembly 604 may be as described in any of the above embodiments in the present application. A joint portion 641 is connected to the scanning assembly

601. A second end 643 of a housing 642 is connected to the other end of the adjustable arm 602.

There are significant advantages to applying the spherical joint and the spherical joint assembly including the spherical joint disclosed above in the present application to the aforementioned ultrasonic imaging device 600. On the one hand, from the perspective of assembly, a cable (not shown in the figure) that enables an electrical connection between the main device 603 and the scanning assembly 601 may pass through the spherical joint during the assembly process even if an ultrasonic transducer assembly, such as a PCB, is connected to an end portion of the cable, and the wiring is not affected. Also, due to the configuration manner of the spherical joint of the present application, during the assembly process, it is not necessary to align the two portions of the spherical joint (i.e. the body portion and the blocking portion) very strictly during assembly. On the other hand, after assembly, due to the high integrity of the spherical surface of the spherical joint of the present application, the rotation of the scanning assembly 601 does not generate a large force of friction when used by the user, thereby not affecting the operation. Furthermore, due to the aforementioned design of the through-hole in the middle of the spherical joint of the present application, the cable is also less prone to wear therein, thereby prolonging the service life of the device.

It can be understood that the second end 643 of the housing 642 may be attached to the other end of the adjustable arm 602 in various manners. For example, the second end of the housing and the other end of the adjustable arm may be connected by means of a screw. Alternatively, the second end of the housing and the other end of the adjustable arm may be connected by providing an external thread structure at the other end of the adjustable arm 602 and an internal thread structure at the second end 643 of the housing 642. The present disclosure will not exhaustively enumerate examples herein.

Main components of the ultrasonic imaging device 600 are exemplarily described in more detail below. The main device 603 of the ultrasonic imaging device 600 may include a frame 613, an ultrasonic processor housing 614 including an ultrasonic processor, and an electrical element and a mechanical structure arranged inside the aforementioned housing. In one embodiment, the adjustable arm 602 may include a hinge joint 612, so that the adjustable arm 602 can rotate more freely in a horizontal plane direction. Furthermore, the ultrasound imaging device 600 may further include a display 605. The display 605 enables a user to easily observe an ultrasonic scanning process and result during ultrasonic scanning. The display 605 is connected to the frame 613 at a joining point where the adjustable arm 602 enters the frame 613. Since the display 605 is directly connected to the frame 613 rather than the adjustable arm 602, the display 605 does not affect the weight of the adjustable arm 602 and a balancing mechanism of the adjustable arm 602 (for example, a counterweight arranged inside the frame 613). In one example, the display 605 may rotate in horizontal and transverse directions (for example, rotatable about a central axis of the frame 613), but cannot move vertically. In an alternative example, the display 605 may also be vertically movable. Although FIG. 6 illustrates the display 605 connected to the frame 613, in other examples, the display 605 may be connected to different parts of the ultrasonic imaging system 600, such as connected to the ultrasonic processor housing 614, or positioned away from the ultrasonic imaging device 600.

In one embodiment, the adjustable arm 602 is configured and adapted such that the scanning assembly 601 is neutrally buoyant in space, or has a light net downward weight (for example, 1-2 kg) for pressing the breast, while allowing easy user operation. In an alternative embodiment, the adjustable arm 602 is configured such that the scanning assembly 601 is neutrally buoyant in space during positioning of a scanner on tissue of a patient. Then, after the scanning assembly 601 is positioned, internal components of the ultrasonic imaging device 600 may be adjusted to apply a desired downward weight for pressing the breast and improved image quality. In one example, the downward weight (for example, a force) may be in the range of 2-11 kg.

As described above, the adjustable arm 602 includes the hinge joint 612. The hinge joint 612 divides the adjustable arm 602 into a first arm portion and a second arm portion. The first arm portion is connected to the scanning assembly 601, and the second arm portion is connected to the frame 613. The hinge joint 612 allows the second arm portion to rotate relative to the second arm portion and the frame 613. For example, the hinge joint 612 allows the scanning assembly 601 to translate transversely and horizontally, but not vertically, relative to the second arm portion and the frame 613. In such a manner, the scanning assembly 601 may rotate towards the frame 613 or away from the frame 613. However, the hinge joint 612 is configured to allow the entire adjustable arm 602 (for example, the first arm portion and the second arm portion) to move vertically together as a whole (for example, translating upward and downward along with the frame 613).

The bottom of the scanning assembly 601 may include a film (not shown) that is in a substantially tensioned state to be at least partially attached, and is used to press the breast. The film has a bottom surface for contacting the breast, and when the bottom surface is in contact with the breast, the transducer sweeps over a top surface of the film to scan the breast. In one example, the film is a tensioned fabric sheet.

The scanning assembly 601 may further include a handle 611. When performing scanning by means of the ultrasonic imaging device 600, a user may hold the handle 611 to adjust the height of the scanning assembly 601. The specific adjustment manner may be raising or lowering the adjustable arm 602 until the scanning assembly 601 has a suitable position relative to a surface to be scanned. Further, the user may hold the handle 611 to twist the scanning assembly 601. In this case, the scanning assembly 601 may rotate or tilt over a large angular range due to the high-degree-of-freedom mobility of the spherical joint assembly 604. Finally, the user is enabled to select the optimal imaging angle for imaging.

A fully functional ultrasonic engine may be provided within the ultrasonic processor housing 614, and is configured to drive the ultrasonic transducer, and generate volumetric breast ultrasound data from a scan in conjunction with related position and orientation information. In some examples, volumetric scan data may be transmitted to another computer system by using any of a variety of data transmission methods known in the art so as to be further processed, or the volumetric scan data may be processed by the ultrasonic engine. A general-purpose computer/processor integrated with the ultrasonic engine may further be provided for general user interface and system control. The general-purpose computer may be a self-contained stand-alone unit, or may be remotely controlled, configured, and/or monitored by remote stations connected across networks.

It should be noted that the above is only an exemplary description of the ultrasonic imaging device 600, the construction of the components thereof may also be arbitrary in the art, and there is no limitation here.

The purpose of providing the above specific embodiments is to allow the content disclosed in the present application to be understood more thoroughly and comprehensively, but the present application is not limited to these specific embodiments. Those skilled in the art should understand that various modifications, equivalent replacements, and changes can be further made to the present application and should be included in the scope of protection of the present application as long as these changes do not depart from the spirit of the present application.

The invention claimed is:

1. A spherical joint, comprising:
a body portion, the body portion comprising a ball portion and a joint portion, the ball portion and the joint portion having an inner surface that links the two portions together in an axial direction and an outer surface opposite to the inner surface, the outer surface of the ball portion comprising a spherical surface, the body portion further comprising a first section and a second section, each of the first section and the second section intersecting with the inner surface and the outer surface such that the two sections together define a gap, and the size of the gap on any radial circumference of the spherical surface being less than half of the length of the radial circumference; and
a blocking portion detachably connected to the body portion and shaped to match the gap, so that the blocking portion blocks the gap to form a hollow spherical joint structure.

2. The spherical joint according to claim 1, wherein the first section and the second section are configured to be arranged opposite to each other, so that the shape of the gap is defined as a slot shape.

3. The spherical joint according to claim 1, wherein the inner surface of the ball portion gradually increases in size in a direction toward an end portion of the ball portion.

4. The spherical joint according to claim 1, wherein the inner surface of the ball portion comprises an arc-shaped surface at an end portion of the ball portion, and the arc-shaped surface is connected to the outer surface of the ball portion.

5. The spherical joint according to claim 1, further comprising:
a connection portion, the body portion and the blocking portion being detachably connected by means of the connection portion.

6. The spherical joint according to claim 5, wherein
the body portion is provided with a through-hole;
the blocking portion is provided with a screw hole in a position corresponding to the through-hole; and
the connection portion comprises a screw, the screw passes through the through-hole and is connected to the screw hole so that the body portion and the blocking portion are detachably connected.

7. The spherical joint according to claim 6, wherein the outer surface of the body portion comprises a recess portion, the recess portion is sized to accommodate an end portion of the screw, and the through-hole is disposed in the recess portion.

8. The spherical joint according to claim 1, wherein an end of the joint portion in proximity to the ball portion is configured as a cylindrical rod.

9. A spherical joint assembly, comprising:
a spherical joint, comprising:
a body portion, the body portion comprising a ball portion and a joint portion, the ball portion and the joint portion having an inner surface that links the two portions together in an axial direction and an outer surface opposite to the inner surface, the outer surface of the ball portion comprising a spherical surface, the body portion further comprising a first section and a second section, each of the first section and the second section intersecting with the inner surface and the outer surface such that the two sections together define a gap, and the size of the gap on any radial circumference of the spherical surface being less than half of the length of the radial circumference; and
a blocking portion detachably connected to the body portion and shaped to match the gap, so that the blocking portion blocks the gap to form a hollow spherical joint structure; and
a housing, comprising a first end and a second end arranged opposite to each other, the first end comprising a circular arc-shaped inner cavity and an opening, the inner cavity being shaped to match the ball portion of the spherical joint, and the opening being sized to be less than an outer diameter of the ball portion and to allow passage of the joint portion.

10. The spherical joint assembly according to claim 9, wherein
the first end of the housing is detachably connected to a body of the housing.

11. The spherical joint assembly according to claim 9, wherein
the first section and the second section are configured to be arranged opposite to each other, so that the shape of the gap is defined as a slot shape.

12. The spherical joint assembly according to claim 9, wherein
the inner surface of the ball portion gradually increases in size in a direction toward an end portion of the ball portion.

13. The spherical joint assembly according to claim 9, wherein
the inner surface of the ball portion comprises an arc-shaped surface at an end portion of the ball portion, and the arc-shaped surface is connected to the outer surface of the ball portion.

14. The spherical joint assembly according to claim 9, wherein the spherical joint further comprises:
a connection portion, the body portion and the blocking portion being detachably connected by means of the connection portion.

15. The spherical joint assembly according to claim 14, wherein
the body portion is provided with a through-hole;
the blocking portion is provided with a screw hole in a position corresponding to the through-hole; and
the connection portion comprises a screw, the screw passes through the through-hole and is connected to the screw hole so that the body portion and the blocking portion are detachably connected.

16. An ultrasonic imaging device, comprising:
a scanning assembly, comprising an ultrasonic transducer;
an adjustable arm;
a main device, connected to one end of the adjustable arm; and a spherical joint assembly, comprising:
  a spherical joint, the spherical joint comprising a body portion and a blocking portion, the body portion comprising a ball portion and a joint portion, the ball portion and the joint portion having an inner surface that links the two portions together in an axial direction and an outer surface opposite to the inner surface, the outer surface of the ball portion comprising a spherical surface, the body portion further comprising a first section and a second section, each of the first section and the second section intersecting with the inner surface and the outer surface such that the two sections together define a gap, the size of the gap on any radial circumference of the spherical surface being less than half of the length of the radial circumference, and the blocking portion being detachably connected to the body portion and shaped to match the gap, so that the blocking portion blocks the gap to form a hollow spherical joint structure; and
  a housing, comprising a first end and a second end arranged opposite to each other, the first end comprising a circular arc-shaped inner cavity and an opening, the inner cavity being shaped to match the ball portion of the spherical joint, and the opening being sized to be less than an outer diameter of the ball portion and to allow passage of the joint portion, wherein the joint portion of the spherical joint is connected to the scanning assembly, and the second end of the housing is connected to the other end of the adjustable arm.

17. The ultrasonic imaging device according to claim 16, wherein
  the first section and the second section are configured to be arranged opposite to each other, so that the shape of the gap is defined as a slot shape.

18. The ultrasonic imaging device according to claim 16, wherein the spherical joint further comprises:
  a connection portion, the body portion and the blocking portion being detachably connected by means of the connection portion.

19. The ultrasonic imaging device according to claim 18, wherein
  the body portion is provided with a through-hole;
  the blocking portion is provided with a screw hole in a position corresponding to the through-hole; and
  the connection portion comprises a screw, the screw passes through the through-hole and is connected to the screw hole so that the body portion and the blocking portion are detachably connected.

20. The ultrasonic imaging device according to claim 19, wherein
  the outer surface of the body portion comprises a recess portion, the recess portion is sized to accommodate an end portion of the screw, and the through-hole is disposed in the recess portion.

* * * * *